(12) United States Patent
Jacobs et al.

(10) Patent No.: US 7,252,113 B2
(45) Date of Patent: Aug. 7, 2007

(54) MECHANICAL IN LINE TIMER VALVE

(75) Inventors: Scott Jacobs, Peoria, IL (US); Lawrence P. Heren, East Peoria, IL (US); John Wisslead, East Peoria, IL (US)

(73) Assignee: L.R. Nelson Corporation, Peoria, IL (US)

( * ) Notice: Subject to any disclaimer, the term of this patent is extended or adjusted under 35 U.S.C. 154(b) by 210 days.

(21) Appl. No.: 10/891,285

(22) Filed: Jul. 14, 2004

(65) Prior Publication Data

US 2006/0011243 A1   Jan. 19, 2006

(51) Int. Cl.
*G01F 11/30* (2006.01)

(52) U.S. Cl. ............................. 137/624.11; 137/624.21

(58) Field of Classification Search ........... 137/624.11, 137/624.21, 624.22
See application file for complete search history.

(56) References Cited

U.S. PATENT DOCUMENTS

| | | | |
|---|---|---|---|
| 2,837,154 A * | 6/1958 | Harper et al. ........... | 137/624.22 |
| 2,891,406 A * | 6/1959 | Stoner ................... | 137/624.22 |
| 3,097,762 A | 7/1963 | Charnota et al. | |
| 3,547,154 A | 12/1970 | Benham | |
| 3,555,809 A * | 1/1971 | Michael ................. | 368/99 |
| 3,578,245 A | 5/1971 | Brock | |
| 3,638,682 A | 2/1972 | Heyer et al. | |
| 3,726,477 A | 4/1973 | Shapiro | |
| 3,894,557 A * | 7/1975 | Impett .................. | 137/624.22 |
| 3,912,167 A | 10/1975 | Simon | |
| 4,003,402 A | 1/1977 | Corliss et al. | |
| 4,023,585 A | 5/1977 | VandenBurg | |
| 4,070,820 A * | 1/1978 | Lewinter et al. .............. | 368/99 |

(Continued)

FOREIGN PATENT DOCUMENTS

FR          2657496          8/1991

(Continued)

*Primary Examiner*—Eric Keasel
*Assistant Examiner*—Cloud Lee
(74) *Attorney, Agent, or Firm*—Brinks Hofer Gilson & Lione

(57) ABSTRACT

An in line mechanical timing valve is disclosed. The valve has an inlet capable of being coupled to a water source and an outlet. A valve housing is fluidly coupled to the inlet and the outlet to control water flow between the inlet and the outlet. A bisecting cylinder is installed perpendicular to the inlet and outlet. The bisecting cylinder has a central axis and a diaphragm which has an open position allowing water flow to the outlet and a closed position preventing water flow to the outlet. A dial knob has an extended position and a retracted position. The dial knob is rotatable about the central axis of the bisecting cylinder when in the retracted position. A timing mechanism has a windup shaft parallel to the central axis of the bisecting cylinder. One end of the windup shaft has one end coupled to the dial knob which allows the timing mechanism to be set by the dial knob. A shaft parallel to the central axis of the bisecting cylinder is inserted through the timing mechanism. The shaft has a first end which is coupled to the diaphragm and an opposite second end which is coupled to the dial knob. The dial knob may be rotated to set the timing mechanism to remain in an extended position for a set period of time.

16 Claims, 3 Drawing Sheets

U.S. PATENT DOCUMENTS

| | | |
|---|---|---|
| 4,130,135 A | 12/1978 | Moore |
| 4,153,380 A | 5/1979 | Hartman |
| 4,156,396 A | 5/1979 | Konucik |
| 4,270,574 A | 6/1981 | Graber |
| 4,351,360 A | 9/1982 | Smyth |
| 4,514,930 A | 5/1985 | Schorr et al. |
| 4,526,198 A | 7/1985 | Scott |
| 4,562,865 A | 1/1986 | Lemkin et al. |
| 4,633,905 A | 1/1987 | Wang |
| 4,708,264 A | 11/1987 | Bruninga |
| D298,962 S | 12/1988 | Bruninga |
| 4,866,880 A | 9/1989 | Weinblatt |
| 5,033,509 A | 7/1991 | Tsai |
| 5,813,606 A | 9/1998 | Ziff |
| 5,813,655 A | 9/1998 | Pinchott et al. |
| 5,921,280 A | 7/1999 | Ericksen et al. |
| 5,964,403 A | 10/1999 | Miller et al. |
| 6,243,986 B1 | 6/2001 | Crowley |
| 6,283,139 B1 | 9/2001 | Symonds et al. |
| 6,337,635 B1 | 1/2002 | Ericksen et al. |
| 6,491,062 B1 | 12/2002 | Croft |
| 6,755,213 B1 * | 6/2004 | Lai ..................... 137/624.11 |

FOREIGN PATENT DOCUMENTS

| | | |
|---|---|---|
| FR | 2751840 | 2/1998 |
| WO | WO 2004/006026 | 1/2004 |

* cited by examiner

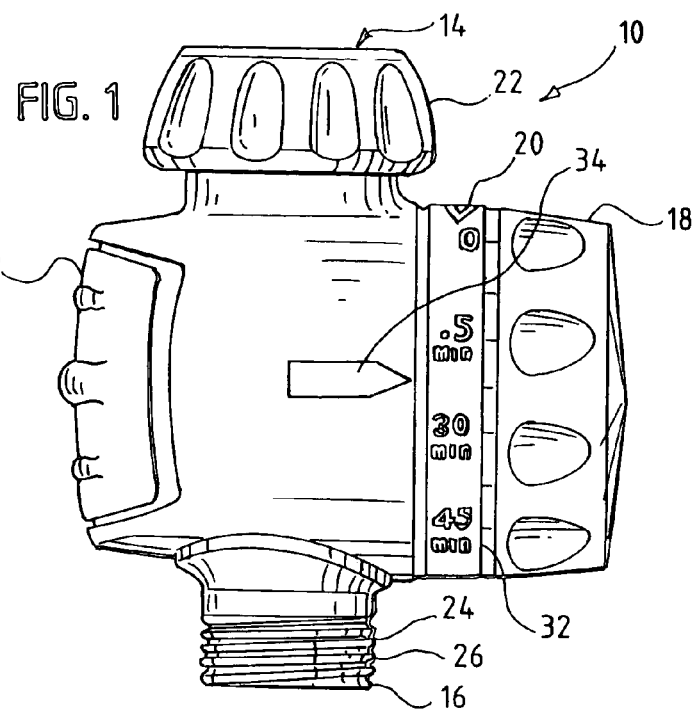
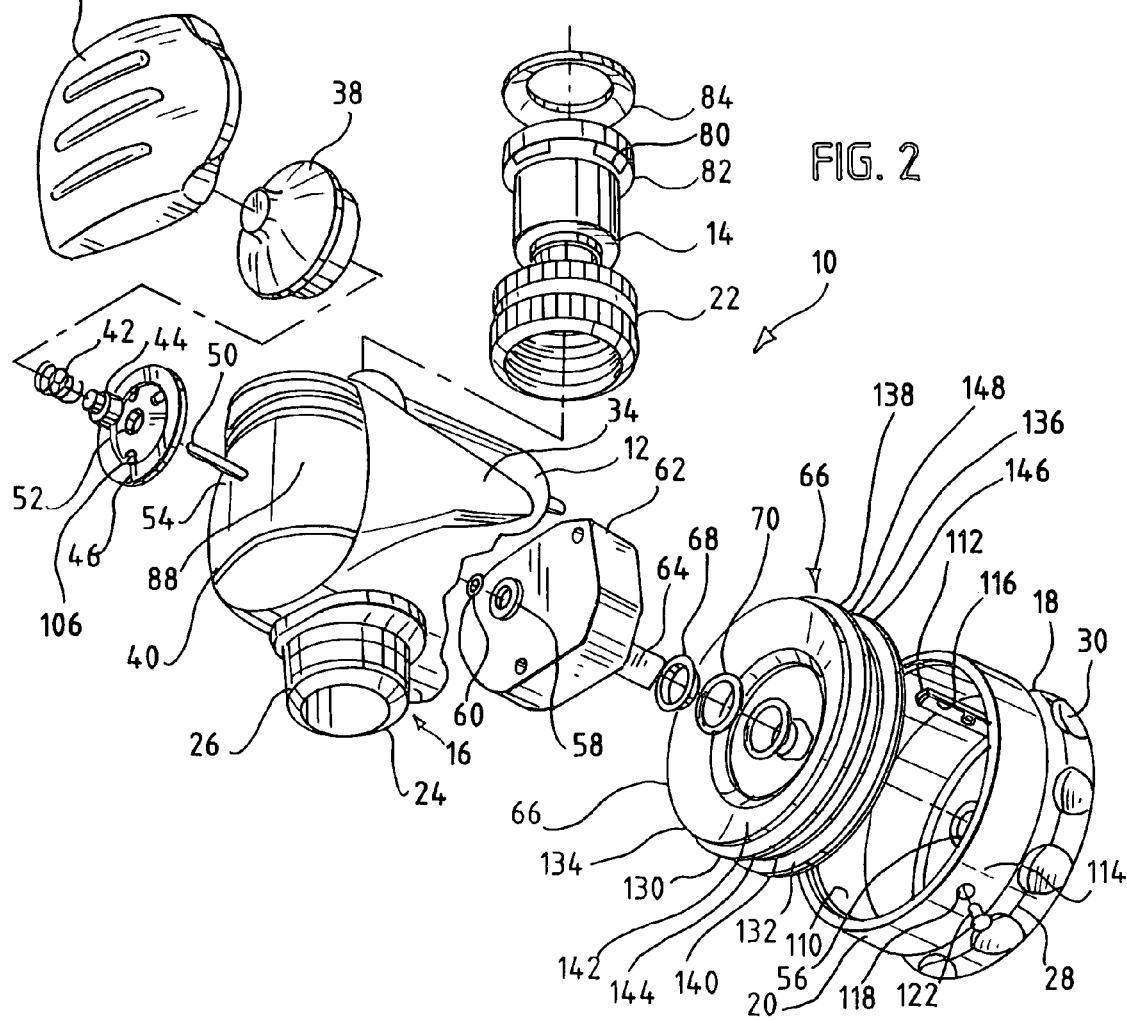

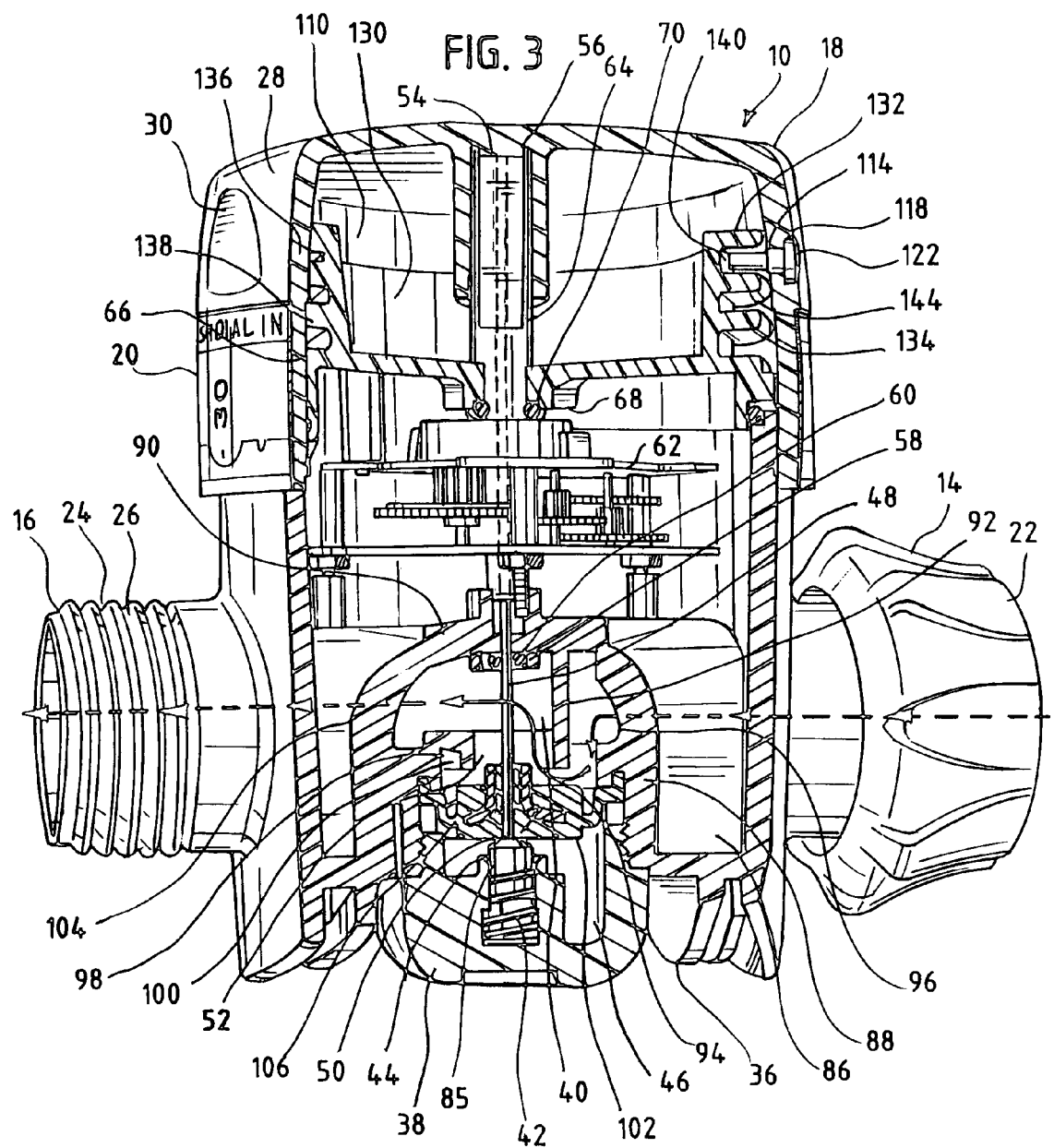

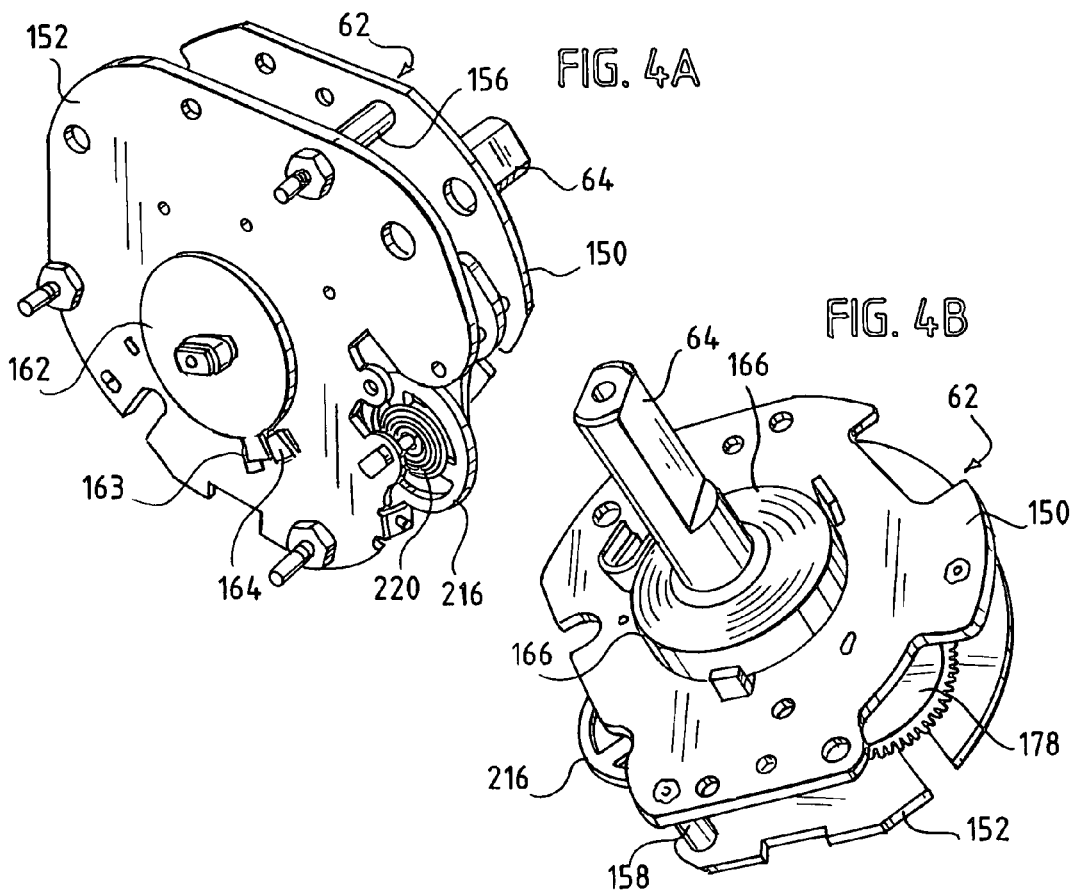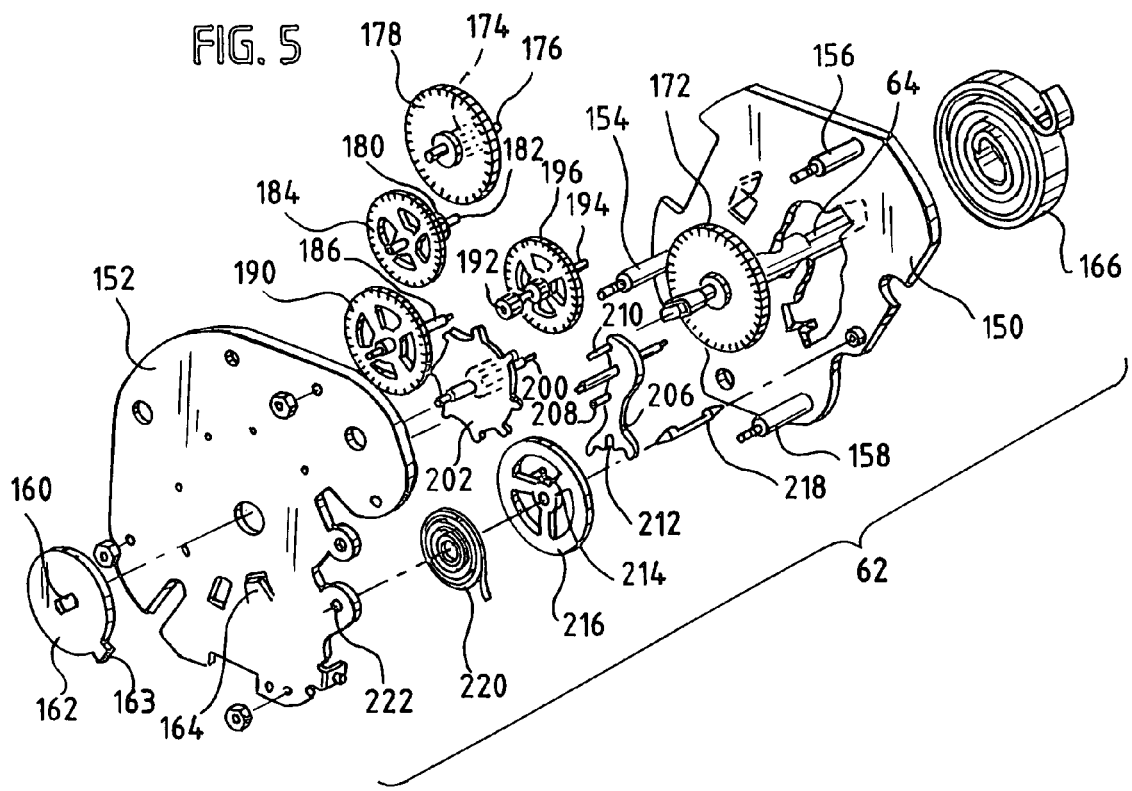

MECHANICAL IN LINE TIMER VALVE

FIELD OF INVENTION

The present invention relates generally to the field of water valve timers. More specifically, the present invention is directed to an in-line mechanical timer which controls a valve for irrigation applications.

BACKGROUND OF INVENTION

There has been a need for timer valves which permit flow of water for certain periods of time. These valves include a water inlet and an outlet. A water source, such as a spigot, is connected to the inlet while a hose or other watering device is coupled to the outlet. The valve is controlled by a timing device which will open the valve and keep it open to allow water flow to the outlet. In such a manner, a user simply sets the timer for a determined period of time. The user does not have to return to the valve to shut off the water flow to prevent over watering.

Various timer mechanisms have been used in the past. For example an electric timer has been used. Electronic timers may be analog or digital and may also use electrical power to actuate the valve. Such timers are very accurate, but suffer from several shortcomings. If the electrical power is supplied by a battery, the timer has a limited life. Further, the timer must be constructed to protect the battery from outside elements increasing the weight of the device and the number of component parts. Alternatively, electrical power may be supplied through a standard electrical outlet. However, this limits the effective range of the valve as it must be placed in proximity to an electrical outlet in order to function. Also, electrical devices have some safety risk due to electrical shock.

Another type of timer which has been used is a water driven timer such as that described in U.S. Pat. No. 4,708,264. Such a timer has an impeller interposed between the inlet and outlet of the valve and is rotated by the water flow. A gearing system is coupled to the impeller to eventually activate the valve to stop the water flow. The impeller based timer is self running and thus does not require an independent power source. However, this type of timer suffers from inaccuracy as the rotational speed of the impeller depends entirely on water flow which may not be constant from source to source. In addition, if the water flow is low pressure, the valve may not shut off properly.

A variety of valves have used mechanical wind up timers. These timers do not require an external power source and operate using a spring which is wound up and gradually released to activate the valve. However, such timers are mechanically complex and require more internal space in the valve housing thus increasing manufacturing costs. Further, since the timing mechanism does not directly couple to the valve, additional torque must be generated by the spring and thus the valve is not as efficient.

Thus, there is a need for a mechanical timer in which the mechanical components are in-line with the valve to conserve space. There is a further need for a mechanical timer which is accurate but requires no outside power sources. There is also a need for a mechanical timer which has a less complex assembly.

SUMMARY OF THE INVENTION

These needs and others may be met by the present invention, one example of which is a timer valve for controlling the flow of water. The valve has a main body having an inlet and outlet for communication of water through the valve. A valve is located between the inlet and outlet, the valve having a plunger shaft therethrough which activates the valve. A timing mechanism is provided which controls the plunger shaft, the timing mechanism has gearing and a windup shaft which turns the gearing. The windup shaft extends parallel to the plunger shaft. A control mechanism is coupled to the windup shaft and allows the timing mechanism to be set to move the plunger shaft to activate the valve for a predetermined amount of time.

Another example of the present invention is a timing valve having an inlet capable of being coupled to a water source and an outlet. A valve housing is fluidly coupled to the inlet and the outlet to control water flow between the inlet and the outlet. A bisecting cylinder valve is provided perpendicular to the inlet and outlet, the bisecting cylinder having a central axis and a diaphragm which has an open position allowing water flow to the outlet and a closed position preventing water flow to the outlet. A dial knob has an extended position and a retracted position and the dial knob is rotatable about the central axis of the bisecting cylinder when in the retracted position. A timing mechanism has a windup shaft parallel to the central axis of the bisecting cylinder, the windup shaft having one end coupled to the dial knob. A plunger shaft is parallel to the central axis of the bisecting cylinder and inserted through the timing mechanism. The plunger shaft has a first end which is coupled to the diaphragm and an opposite second end which is coupled to the dial knob. The dial cap may be rotated in the retracted position to set the timing mechanism to remain in the retracted position for a set period of time.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein:

FIG. 1 is a perspective view of a mechanical timer valve according to one example of the present invention;

FIG. 2 is an exploded view of the components of the mechanical timer valve in FIG. 1;

FIG. 3 is a cross section of the valve chamber in the mechanical timer valve of FIG. 1;

FIG. 4A is a front perspective view of the timing mechanism of the mechanical timer valve in FIG. 1;

FIG. 4b is a back perspective view of the timing mechanism of the mechanical timer valve in FIG. 1 and FIG. 5 is an exploded view of the parts of the timing mechanism in FIGS. 4A and 4B.

DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

FIGS. 1-2 show a mechanical timing valve 10 which is one example of the present invention. The mechanical timing valve 10 has a main body 12 which has a water inlet 14 and a water outlet 16. The main body 12 also has a dial knob 18 and a corresponding indicator collar 20. The water inlet 14 has a hose coupler 22 which is a standard sill cock connector although other types of hose connectors may be used such as a quick connect connector. The water outlet 16 has a male coupling member 24 which has a threaded exterior 26 for coupling to a hose or another watering device.

The dial knob 18 has a gripping surface 28 which has various indentations 30 to facilitate gripping the dial 18 and turning the dial 18. The indicator collar 20 has a series of time markings 32 which may be aligned with an indicator 34 located on the surface of the body 12. The dial knob 18 may thus be turned so the appropriate time marking 32 is aligned with the indicator 34 to set the amount of time the valve remains open. The time ranges in this example range from 0-180 minutes, but of course other time ranges may be used. Other means of setting time may be used. For example, the time markings may be marked on the body 12 and the indicator could be placed on the dial knob 18.

The dial knob 18 is installed opposite an end piece 36 on the body 12 and contains a diaphragm weld cap 38 in place over an outlet valve chamber 40 formed in the interior of the body 12. The weld cap 38 holds a spring 42 which is located around a plunger 44. The spring 42 and plunger 44 are in contact with a diaphragm 46. The spring force of the spring 42 biases the diaphragm 46 away from the weld cap 38 to close the valve and prevent water flow between the inlet 14 and the outlet 16. A plunger shaft 48 has one end 50 which is inserted through a center hole 52 in the diaphragm 46 and is put in contact with the plunger 44. The plunger shaft 48 has an opposite end 54 which is inserted through the valve chamber 40 to a socket 56 which is on the interior of the dial knob 18.

A weld cap 58 is inserted on the plunger shaft 48 and in conjunction with an O-ring 60 prevents water from leaking from the outlet valve chamber 40. The plunger shaft 48 runs through a timer mechanism 62 which is installed on the outlet valve chamber 40 opposite the diaphragm 46. The timer mechanism 62 has a wind up shaft 64 which is inserted in the socket 56 on the dial knob 18. The dial knob 18 encloses an end cap 66 through which the plunger shaft 48 and wind up shaft 64 are inserted. A timer shaft weld cap 68 and O-ring 70 are inserted on the wind up shaft 64 to separate the timer mechanism 62 and the end cap 66.

The inlet 14 includes a cylindrical shank coupling 80 which has an interior shoulder 82. A hose washer 84 is seated on the interior shoulder 82 and provides a seal between a spigot and the inlet 16.

FIG. 3 shows a cross section perspective view of the outlet valve chamber 40, which in conjunction with diaphragm 46, make up the valve that controls water flow between the inlet 14 and the outlet 16. The diaphragm 46 is constructed of a reslient material such as plastic or rubber and includes a metal insert 85 for stiffening and support. The inlet 14 and outlet 16 form a lateral cylinder 86. A horizontal cylinder 88 is formed at a right angle to the lateral cylinder 86. The horizontal cylinder 88 has an end wall 90 which is in proximity to the timer mechanism 62. An interior cylinder 92 has one end which is closed off by the end wall 90 and an open end 94 which is the same height as the horizontal cylinder 88. An inlet aperture 96 is formed in the horizontal cylinder 88 facing the inlet 14. A wall 98 and a semi-circular top surface 100 are formed from the exterior of the interior cylinder 92. The top surface 100 in conjunction with the body 12 form the outlet valve chamber 40. An intermediary valve chamber 102 is formed by the diaphragm 46, the weld cap 38 and the horizontal cylinder 88.

The horizontal cylinder 88 has an outlet aperture 104 opposite the inlet aperture 94 which permits water flow from the interior of the interior cylinder 92 to the lateral cylinder 86 and the outlet 16. The diaphragm 46 is seated over the open end of the horizontal cylinder 88 and the interior cylinder 92. In this position, the diaphragm 46 prevents water between the horizontal cylinder 88 and the interior cylinder 92 from flowing into the interior of the interior cylinder 92. The diaphragm 46 is preferably constructed of resilient and flexible material such as rubber or plastic. The diaphragm 46 has a series of small holes 106 which run through the thickness of the diaphragm 46.

In operation, the diaphragm 46 is kept in a closed position against the open end of the cylinders 88 and 92 by the plunger 44 which is urged against the diaphragm 46 by the spring 42. Water from the cylinder 88 flows through the small holes 106 into the intermediary valve chamber 102 resulting in water pressure from the intermediary valve chamber 102 adding additional force on the plunger 44 to keep the diaphragm 46 closed.

When the plunger shaft 48 is moved toward the end cap 36, it compresses the spring 42 and allows the plunger 44 to be moved into the diaphragm weld cap 38. Without the spring 42 pushing the plunger 44, water pressure from water flowing into the inlet 14 and out the horizontal cylinder 88 pushes the diaphragm 46 away from the cylinders 88 and 92. Water is then allowed to exit the intermediary valve chamber 102 through the center hole 52 of the diaphragm 46. The flow of water exiting the valve chamber 102 through the center hole 52 is greater than the flow of water entering the intermediary valve chamber 102 through the small holes 106. Water may then flow between the diaphragm 46 and the cylinders 88 and 92 through the interior of the interior cylinder 92 and out the outlet 16. Once the plunger shaft 48 is allowed to move back away from the weld cap 38, the spring 42 is released, pushing the plunger 44 and diaphragm 46 over the cylinders 88 and 92, closing the valve. The plunger 44 also blocks water flowing out of the intermediary valve chamber 102 through the center hole 52 in the diaphragm 46 causing the intermediary valve chamber 102 to be filled via water flowing in through the small holes 106.

The position of the plunger shaft 48 is controlled by the position of the dial knob 18 relative to the main body 12. In order to set the timer, a user will push in the dial knob 18 toward the body 12 and rotate the dial knob 18 to the desired time on the indicator collar 20 aligned with the indicator 34 as shown in FIG. 1. In so doing the dial knob 18 will move relative to the end cap 66 which will lock the dial knob 18 in place and thus move the shaft 48 into the plunger 44 and compress the spring 42. The shaft 48 is held in this position by the dial knob 18. The diaphragm 46 is then moved away from the cylinders 88 and 92 by water pressure and water may flow to the outlet 16. The valve is thus open allowing water to flow from the inlet 14 to the outlet 16.

The dial knob 18 has an interior surface 110 with two tabs 112 and 114. Two holes 116 and 118 are drilled or cored into the tabs 112 and 114 respectively. Two pins 120 and 122 are installed in the holes 116 and 118 respectively and extend from the interior surface 110 of the dial knob 18. The end cap 66 has a cylindrical body 130 with a top collar 132 and a bottom collar 134. The exterior surface of the cylindrical body 130 has a series of parallel ridges 136 and 138. The top collar 132 and parallel ridge 136 form a circumferential track 140 which is open to a vertical slot 142 which is formed on the top collar 132. The bottom collar 134 and the ridge 138 form a second circumferential track 144. The second circumferential track 144 has a vertical slot 146 which extends from the ridge 138 and a stop 148. The pin 120 travels in the vertical slot 142 and the circumferential track 140 while the pin 122 travels in the vertical slot 146 and the circumferential track 144.

In operation, the valve is normally closed with the dial knob 18 in an extended position allowing the spring 42 to push the diaphragm 46 over the cylinders 88 and 92 and the shaft 48 against the dial knob 18. By pushing the dial knob 18 in a retracted position toward the main body 12, the pin 120 is pushed into the track 140 and the pin 122 is pushed into the track 144. By rotating the dial cap 18, the pins 120 and 122 are fixed in the tracks 140 and 144 and hold the dial knob 18 in the retracted position thus pushing the shaft 48 into the plunger 44 and opening the valve. The stop 148 prevents the roller pin 122 from moving all the way around the track 144 and thus the dial knob 18 from being rotated fully around. As will be explained below, rotating the dial knob 18 winds the timing mechanism 62 which slowly turns the dial knob 18 back to the position where the pins 120 and 122 are aligned with the vertical slots 142 and 146. When the pins 120 and 122 are aligned with the notches 142 and 146, the spring 42 is released, closing the valve by forcing the diaphragm 46 over the cylinders 88 and 92. In addition, the spring 42 forces the dial knob 18 back into its extended position via the shaft 48.

FIGS. 4A, 4B and 5 are views of the timing mechanism 62 which is mounted in the valve body 12 in line with the shaft 48 and a central axis of the valve chamber 40. The windup shaft 64 is rotated by rotating the dial knob 18. The timing mechanism 62 has two opposite plates 150 and 152 which are fixed in place by pins 154, 156 and 158. The windup shaft 64 is seated in a socket 160 which is on the plate 152. A washer 162 is attached to the end of the windup shaft 64 and has a tab 163. The washer 162 rotates with the windup shaft 64 and stops the shaft 64 when the tab 163 contacts a stop 164 formed on the plate 152. In this manner, the windup shaft 64 may only be turned a full rotation. The windup shaft 64 is attached to one end of a coil spring 166 that is held in place on the plate 150. The other end of the coil spring 166 is crimped around a tab 168 extending from the plate 150.

The plates 150 and 152 form a gearbox 170 that provides resistance against the spring force of the coil spring 166. The coil spring 166 is wound up when the windup shaft 64 is turned via the dial knob 18. The coil spring 166 is released on a gradual basis turning the wind up shaft 64 back to its original position.

The windup shaft 64 has a drive gear 172 which is mounted opposite the spring 166 on the side of the plate 150. The drive gear 172 meshes with a sun gear 174 which is mounted on a shaft 176 which is held between the plates 150 and 152. The sun gear 174 is coupled to a planetary gear 178 which meshes with a sun gear 180 which is mounted on a shaft 182 which is held between the plates 150 and 152. In turn, the sun gear 180 is coupled to a planetary gear 184 which meshes with a sun gear 186 which is mounted on a shaft 188 which is held between the plates 150 and 152. The sun gear 186 is coupled to a planetary gear 190 which meshes with a sun gear 192 which is mounted on a shaft 194 which is held between the plates 150 and 152. The shaft 194 also has a planetary gear 196 which is rotated with the sun gear 192. The planetary gear 196 meshes with a sun gear 198 which is mounted on a shaft 200 which is held between the plates 150 and 152. The sun gear 198 is coupled to a sprocket 202 which has a series of circumferential notches 204.

A rocker arm 206 is mounted to swing on a shaft 208. One end of the rocker arm 206 has a pin 210 which rests in the notch 204 of the sprocket 202. When the sprocket rotates, the pin 210 is moved and thus the rocker arm 206 swings on the shaft 208. The opposite end of the rocker arm 206 has gear teeth 212 which mesh with a pin 214. The pin 214 extends from a flywheel 216 which is mounted on a shaft 218 between the plates 150 and 152. The shaft 218 is attached to one end of a spiral spring 220. The other end of the spiral spring 220 is attached to a pin 222 on the plate 152. The series of gears and the resistance of the spring 220 permit the coil spring 166 to rotate the windup shaft 64 slowly to its original position at a constant rotational velocity. The time required to return to the original position is determined by the sun and planetary gears and the angular position that the windup shaft 64 is turned.

The timing mechanism 62 is relatively simple in operation allowing decreased manufacturing and assembly costs. Further, the timing mechanism 62 is installed in-line with the components of the valve 10 to provide compact and internal design of the body 12.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A timer valve for controlling the flow of water, the valve comprising:
   a main body having an inlet and outlet for communication of water through the valve;
   a valve between the inlet and outlet, the valve having a plunger shaft therethrough which activates the valve;
   a timing mechanism controlling the plunger shaft, the timing mechanism having gearing and a windup shaft which turns the gearing, the windup shaft extending parallel to the plunger shaft;
   a first coil spring coupled to the windup shaft, the coil spring being wound up by rotating the windup shaft; and
   wherein the gearing provides resistance against the first coil spring such that when the first coil spring is wound up, it is released slowly to rotate the windup shaft; and
   a control mechanism which is coupled to the windup shaft and allows the timing mechanism to be set to move the plunger shaft to activate the valve for a predetermined amount of time.

2. The timer valve in claim 1 wherein the valve further includes:
   an outlet chamber fluidly coupled to the outlet; an intermediary chamber;
   a diaphragm separating the outlet chamber from the intermediary chamber, the diaphragm having a center hole allowing the plunger shaft to pass therethrough;
   a plunger on one side of the diaphragm;
   a spring in contact with the plunger and opposite the timing mechanism, the spring forcing the diaphragm in a first position to close the valve and prevent water flow between the inlet and the outlet chamber; and wherein movement of the plunger shaft compresses the spring to move the diaphragm in a second position and actuate the valve to permit water flow between the inlet and the outlet chamber.

3. The timer valve of claim 2 wherein the diaphragm is fabricated from a resilient material.

4. The timer valve of claim 2 wherein the diaphragm includes a small hole drilled therethrough to allow water flow from the inlet to the intermediary chamber.

5. The timer valve of claim 1 wherein the control mechanism is a dial knob in contact with one end of the plunger shaft, the dial knob having an extended position and a retracted position which actuates the valve by moving the plunger shaft.

6. The timer valve of claim 5 wherein the dial knob may be rotated to set the timing mechanism in the retracted position.

7. The timer valve of claim 6 wherein the control mechanism includes an end cap within the dial knob, the end cap having an outer surface having a track, the dial knob having a pin which travels with the track when the dial knob is in the retracted position.

8. The timer valve of claim 5 wherein the dial knob has a cylindrical outer surface with time markings representing different times the valve will remain actuated.

9. The timer valve of claim 1 wherein the inlet includes a hose coupler.

10. The timer valve of claim 1 wherein the timing mechanism includes:
a stop washer coupled to one end of the windup shaft, the opposite end of the wind up shaft being coupled to the control mechanism;
wherein the stop washer prevents the windup shaft from being turned more than one rotation.

11. The timer valve of claim 10 wherein the gearing further includes:
a first planetary gear coupled to the windup shaft;
a sun gear intermeshed with the first planetary gear via other planetary and sun gears;
a sprocket coupled to the sun gear;
a rocker arm which swings in relation to the sprocket; and
a second coil spring coupled to a flywheel which has a pin which swings the sprocket.

12. A timing valve comprising:
an inlet capable of being coupled to a water source;
an outlet;
a valve housing fluidly coupled to the inlet and the outlet to control water flow between the inlet and the outlet;
a bisecting cylinder perpendicular to the inlet and outlet, the bisecting cylinder having a central axis and a diaphragm which has an open position allowing water flow to the outlet and a closed position preventing water flow to the outlet;
a dial knob having an extended position and a retracted position and the dial knob being rotatable about the central axis of the bisecting cylinder when in the retracted position;
a timing mechanism having a windup shaft parallel to the central axis of the bisecting cylinder, the windup shaft having a first end coupled to the dial knob; and
a plunger shaft parallel to the central axis of the bisecting cylinder and inserted through the timing mechanism, the plunger shaft having a first end which is coupled to the diaphragm and an opposite second end which is coupled to the dial knob, wherein the dial cap may be rotated in the retracted position to set the timing mechanism to remain in the retracted position for a set period of time;
a first coil spring coupled to the windup shaft, the coil spring being wound up by rotating the windup shaft; and
wherein the gearing provides resistance against the first coil spring such that when the first coil spring is wound up, it is released slowly to rotate the windup shaft.

13. The timer valve of claim 12 further comprising a main body holding the inlet and outlet and valve, the main body having a weld cap on one end of the bisecting cylinder and holding the timing mechanism and dial knob in proximity to the opposite end of the bisecting valve.

14. The timer valve of claim 12 further comprising:
a plunger in contact with the diaphragm and
a spring on the weld cap in contact with the plunger which forces the diaphragm in the closed position.

15. The timer valve of claim 12 further comprising an end cap within the dial knob, the end cap having an outer surface having a track, the dial knob having a pin which travels within the track when the dial knob is in the retracted position.

16. The timer valve of claim 12 wherein the dial cap has an outer cylindrical surface with time indicators relative to the amount of time the timing mechanism allows the valve to stay open.

\* \* \* \* \*